Oct. 1, 1940.  W. A. PEASE  2,216,625
TRUSS PAD
Filed Jan. 18, 1939
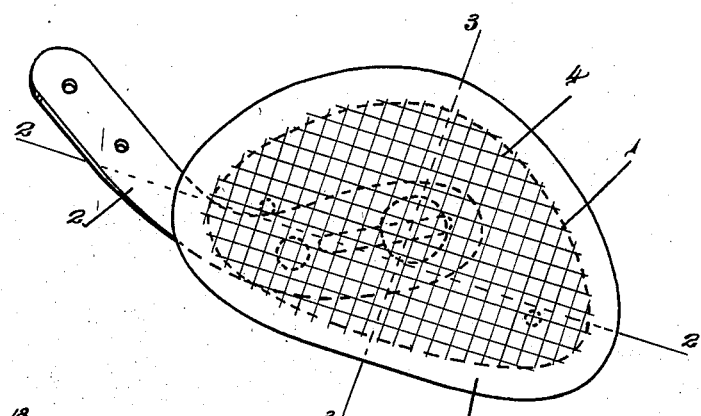
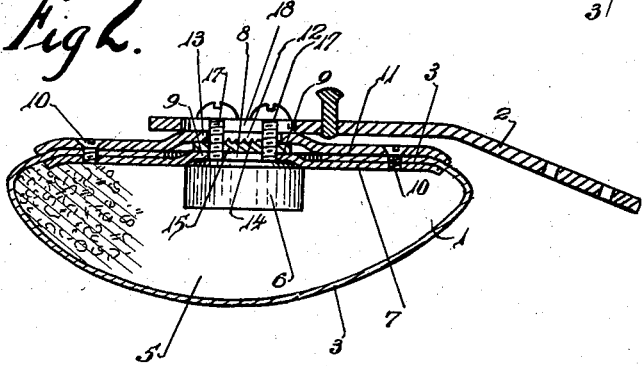
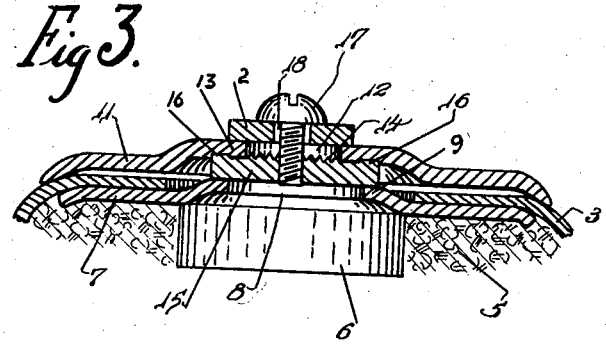
Inventor,
William A. Pease,
By Arthur H. Ewald,
Attorney.

Patented Oct. 1, 1940

2,216,625

UNITED STATES PATENT OFFICE 2,216,625

TRUSS PAD

William A. Pease, Cincinnati, Ohio, assignor to The Ohio Truss Company, a corporation of Ohio Application January 18, 1939, Serial No. 251,572

2 Claims. (Cl. 128—124)

The present invention relates to truss pads of the type used in cases of hernia or for similar purposes.

The principal object of the present invention is to provide an adjustable truss pad of the type mentioned in which the means for adjustment of the pad with relation to the truss arm are simplified in construction and the cost of manufacture of the respective parts greatly reduced.

Further objects of the invention will appear from the following detailed description thereof.

In the drawing:

Figure 1 is a face view of a pad and connections constructed in accordance with this invention.

Figure 2 is a section of the pad on line 2—2 of Figure 1.

Figure 3 is a section thereof on line 3—3 of Figure 1.

The numeral 1 indicates a truss pad of the type used for the treatment and relief of hernia and similar disorders, and the numeral 2 the arm by means of which the pad is secured to the truss belt which may be of any desired construction. The invention resides in providing a readily adjustable relation between the pad 1 and arm 2. The pad 1 consists of a cover of elastic rubber 3, the face of which may be reticulated as shown at 4, or otherwise provided with means to provide against slippage. Inside the cover 3 is a compressible rubber filler or pad 5, the central rear portion of which is provided with a recess 6. Inside the cover 3 is a base plate 7, which has a central opening 8 over the recess 6 of the pad. The plate 7, around the opening 8, is bent outwardly or away from the pad so as to provide an annular shoulder or flange 9. Adapted to be secured to the plate 7 by means of screws 10—10 is a plate 11, similar in shape to the plate 7, the rear edges of the cover 3 being clamped between the plates 7 and 11 as clearly shown in Figures 2 and 3 of the drawing. The plate 11 has a central opening 12, and the portion of the plate around said opening is bent so as to bulge away from the rear of the pad, the bulge being in parallelism with the curvature of plate 7, surrounding the opening 8. The curvature of plate 11 provides an annular flange 13, surrounding the opening 12. The inner surface of the flange 13, around the opening 12, is provided with a series of notches 14 for the purpose hereinafter set forth.

The numeral 15 indicates a disc adapted to fit between the plates 7 and 11, and to ride on the outer surface of flange 9 and the inner surface of flange 13 of the respective plates. The disc 15 is provided with a pair of projections or teeth 16, which are adapted to engage the notches 14 of the plate 11. The disc 15 is provided with a pair of threaded perforations adapted to receive a pair of set screws 17—17. The distance between the perforations for said screws is less than the diameter of the opening 12 of the plate 11, so that the screws may engage into the disc without contacting with plate 11. In assembling the pad with the arm 2, the set screws 17 pass through a slot 18 of the arm 2 and engage in the threaded perforations of disc 15. In adjusting the relative position of the pad with respect to the arm 2 and consequently, as will be obvious, the position of said pad with respect to the truss as a whole, the screws 17 are loosened which permits plates 7 and 11 of the pad to rotate with respect to the disc 15; in such movements, the teeth 16 ride the notches 14 of the flange 13. When proper adjustment has been attained, the set screws 17 are tightened, which brings the teeth 16 into frictional contact with the inner surface of flange 13. In such position, the teeth 16 engage in notches 14 and maintain the adjustment. The opening 8 in plate 7 permits such rotation about the axis of disc 15 notwithstanding the possible extension of the lower end or ends of screws 17 below the lower surface of the disc as shown, for instance in Figure 2. The opening 8 thus prevents the length of said screws from being a critical factor in the construction and assembly of the parts. In other words the opening 8 provides clearance for the lower ends of the screws 17 should they extend below the disc, just as the opening 12 provides clearance for the upper parts of the screws, during the rotation of the pad about the axis of the disc for purposes of adjustment.

It will be obvious that any desired tension may be maintained between the disc 15 and the inner surface of the flange 13, so that adjustment may be made without actually manipulating set screws 17—17, if desired, the teeth of the disc 15 riding the teeth of flange 13. Of course if the set screws 17—17 are screwed tight no adjustment can be made without first loosening them.

Having thus fully described my invention, what I claim as new and desire to secure by Letters Patent is:

1. In a truss pad, an elastic cover for said pad, a base plate, an outwardly projecting flange centrally located on said plate, a second plate adapted to be secured to said base plate, said second plate having an opening over the flange in said base plate, and being provided with an outwardly projecting flange above the flange of said base plate, a disc mounted between said plates and adapted to engage the under side of the flange on said second plate, notches on the under side of the flange on said second plate, teeth on said disc adapted to engage said notches, a truss arm, and means whereby said disc may be secured to said truss arm and said teeth brought into engagement with said notches, and means for securing said plates together so as to clamp between them the edge of said cover.

2. In a truss pad, a base plate, said plate being provided with an opening, an outwardly projecting flange surrounding said opening, a second plate adapted to be secured to said base plate, said second plate having an opening adapted to register with the opening in said base plate, and being provided with an outwardly projecting flange above the flange of said base plate, a disc mounted between said plates and adapted to engage the under side of the flange on said second plate, notches on the under side of the flange on said second plate, teeth on said disc adapted to engage said notches, a truss arm, threaded perforations in said disc, and a pair of screws adapted to screw through said perforations, whereby said pad may be secured to said truss arm and said teeth brought into engagement with said notches, the openings in said plates being adapted to provide clearance for said screws to permit rotary adjustment of said pad around the axis of said disc.

WILLIAM A. PEASE.